(12) United States Patent
Jiang et al.

(10) Patent No.: US 12,058,276 B2
(45) Date of Patent: Aug. 6, 2024

(54) FOLDABLE DISPLAY DEVICE

(71) Applicant: Wuhan China Star Optoelectronics Semiconductor Display Technology Co., Ltd., Hubei (CN)

(72) Inventors: Guobao Jiang, Hubei (CN); Zikang Feng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 380 days.

(21) Appl. No.: 17/441,345

(22) PCT Filed: Jun. 28, 2021

(86) PCT No.: PCT/CN2021/102828
§ 371 (c)(1),
(2) Date: Sep. 21, 2021

(87) PCT Pub. No.: WO2022/252318
PCT Pub. Date: Dec. 8, 2022

(65) Prior Publication Data
US 2023/0231941 A1    Jul. 20, 2023

(30) Foreign Application Priority Data
Jun. 3, 2021 (CN) .......................... 202110621091.0

(51) Int. Cl.
*G06F 1/16* (2006.01)
*H04M 1/02* (2006.01)

(52) U.S. Cl.
CPC ........ *H04M 1/0216* (2013.01); *G06F 1/1681* (2013.01)

(58) Field of Classification Search
CPC .. H04M 1/0216; H04M 1/0268; H04M 1/022; G06F 1/1681; G09F 9/301; F16C 11/04
See application file for complete search history.

(56) References Cited

U.S. PATENT DOCUMENTS 9,848,502 B1 * 12/2017 Chu .......................... E05D 7/00
10,824,197 B1 * 11/2020 Hsu ....................... G06F 1/1641
(Continued)

FOREIGN PATENT DOCUMENTS

| CN | 211259337 | 8/2020 |
| CN | 112324795 | 2/2021 |

(Continued)

OTHER PUBLICATIONS

International Search Report and the Written Opinion Dated Mar. 1, 2022 From the International Searching Authority Re. Application No. PCT/CN2021/102828 and Its Translation Into English. (16 Pages).

*Primary Examiner* — Anthony M Haughton
*Assistant Examiner* — Theron S Milliser

(57) ABSTRACT

A foldable display device is provided. The foldable display device includes a display panel and a rotation mechanism supporting the display panel. The rotation mechanism includes a fixed member, and a first rotating member and a second rotating member which are rotatably connected with the fixed member. A positioning component on the first rotating member is slidingly connected with a guide rail on a first torsion member, and a positioning component on the second rotating member is slidingly connected with a guide rail on a second torsion member.

16 Claims, 12 Drawing Sheets

(56) References Cited

U.S. PATENT DOCUMENTS

| | | | | |
|---|---|---|---|---|
| 11,287,853 B2* | 3/2022 | Yao | .................. | G06F 1/1652 |
| 11,336,759 B2* | 5/2022 | Liao | .................. | H04M 1/021 |
| 11,467,633 B2* | 10/2022 | Liao | .................. | H04M 1/0268 |
| 11,625,073 B2* | 4/2023 | Shim | .................. | G06F 1/1681 |
| | | | | 361/679.28 |
| 11,625,076 B2* | 4/2023 | Yao | .................. | G06F 1/1616 |
| | | | | 16/354 |
| 11,726,530 B2* | 8/2023 | Kang | .................. | H04M 1/022 |
| | | | | 361/679.27 |
| 11,832,405 B2* | 11/2023 | Zhang | .................. | H05K 5/0226 |
| 2021/0165466 A1* | 6/2021 | Kang | .................. | G06F 1/1681 |
| 2021/0173449 A1* | 6/2021 | Yao | .................. | G06F 1/1616 |
| 2021/0181808 A1* | 6/2021 | Liao | .................. | G06F 1/1641 |
| 2021/0247815 A1* | 8/2021 | Shim | .................. | G06F 1/1681 |
| 2021/0368032 A1* | 11/2021 | Liao | .................. | G06F 1/1681 |
| 2022/0035421 A1* | 2/2022 | Yao | .................. | G06F 1/1652 |
| 2022/0159109 A1* | 5/2022 | Kang | .................. | G06F 1/1681 |
| 2023/0053947 A1* | 2/2023 | Liu | .................. | G06F 1/1652 |
| 2023/0054923 A1* | 2/2023 | Liao | .................. | G06F 1/1641 |
| 2023/0229204 A1* | 7/2023 | Shim | .................. | G06F 1/1641 |
| | | | | 361/679.28 |
| 2023/0359252 A1* | 11/2023 | Kang | .................. | H04M 1/022 |

FOREIGN PATENT DOCUMENTS

| | | |
|---|---|---|
| CN | 112443562 | 3/2021 |
| CN | 215730566 | 2/2022 |
| KR | 10-2021-0054954 | 5/2021 |
| TW | M602178 | 10/2020 |

* cited by examiner

FOLDABLE DISPLAY DEVICE

RELATED APPLICATIONS

This application is a National Phase of PCT Patent Application No. PCT/CN2021/102828 having International filing date of Jun. 28, 2021, which claims the benefit of priority of Chinese Patent Application No. 202110621091.0 filed on Jun. 3, 2021. The contents of the above applications are all incorporated by reference as if fully set forth herein in their entirety.

FIELD AND BACKGROUND OF THE INVENTION

The present disclosure relates to a field of display technologies, and more particularly to a foldable display device.

Foldable display devices with flexibility are increasingly popular in the market. A cell phone with a flexible screen refers to a cell phone utilizing a bendable screen with desirable flexibility. Compared with traditional screens, the advantages of the flexible screen are obvious. Not only are whole new use effects provided to the user, but also the volume is compact. The power consumption is lower. Meanwhile, the screen has flexibility, so that the risk of cracking the screen is lowered.

A foldable hinge is an important component for implementing the foldability of the flexible display device. It plays an important role in screen protection, folding synchronization, and so on. The folding hinge drives a torsion arm to rotate through rotating brackets on both sides to implement the synchronous rotation of the structure on both sides of the folding hinge. At present, the rotation of the torsion arm driven by the rotating bracket is implemented by connecting a connecting rod disposed on the torsion arm to a sliding groove on the rotating bracket. Since the rotating bracket is the source of the rotating power of the torsion arm, the connecting rod disposed on the torsion arm will exert force on a lower end surface of the sliding groove during the folding process of the folding hinge, such that the lower end surface of the sliding groove is deformed or broken, thereby affecting the smoothness of folding of the display device and the synchronization of both sides.

SUMMARY OF THE INVENTION

Technical Problem

The current folding hinge has technical problems that the lower end surface of the sliding groove on the rotating bracket is deformed or broken by the compression of the connecting rod on the torsion arm.

Technical Solutions

The present disclosure provides a foldable display device used to solve the technical problems existed in the current folding hinge that the lower end surface of the sliding groove on the rotating bracket is deformed or broken by the compression of the connecting rod on the torsion arm.

The present disclosure provides a foldable display device comprising a display panel and a rotation mechanism supporting the display panel, wherein the rotation mechanism comprises:

a fixed member;
a first rotating member and a second rotating member, wherein the first rotating member is rotatably connected with a side of the fixed member, the second rotating member is rotatably connected with the other side of the fixed member, the first rotating member comprises a first positioning component, and the second rotating member comprises a second positioning component;
a first central component and a second central component, wherein the first central component and the second central component are both disposed corresponding to a lateral end surface of the fixed member; and
a first torsion member and a second torsion member, wherein the first torsion member is connected with the first central component, the second torsion member is connected with the second central component, the first torsion member and the second torsion member are both rotatable with respect to the fixed member, the first torsion member comprises a first guide rail, the first positioning component is connected to the first guide rail and is slidable with respect to the first guide rail, the second torsion member comprises a second guide rail, and the second positioning component is connected to the second guide rail and is slidable with respect to the second guide rail.

In a foldable display device of the present disclosure, a thickness of at least half of an area of the first torsion member located on the first guide rail close to a side of the display panel is greater than a thickness of the first torsion member located on the first guide rail away from the side of the display panel; and a thickness of at least half of an area of the second torsion member located on the second guide rail close to the side of the display panel is greater than a thickness of the second torsion member located on the second guide rail away from the side of the display panel.

In a foldable display device of the present disclosure, the first rotating member comprises a first supporting portion, the first positioning component is connected with the first supporting portion, the second rotating member comprises a second supporting portion, and the second positioning component is connected with the second supporting portion;

the first rotating member and the first torsion member are arranged along a first direction, and the second rotating member and the second torsion member are arranged along the first direction; and the first positioning component extends the first supporting portion along the first direction and connects the first guide rail, and the second positioning component extends the second supporting portion along the first direction and connects the second guide rail.

In a foldable display device of the present disclosure, the first positioning component and the second positioning component comprise a positioning rod; the first guide rail and the second guide rail comprise a groove structure or a hole structure; the first supporting portion comprises a first positioning hole, and the first positioning component penetrates through the first positioning hole; and the second supporting portion comprises a second positioning hole, and the second positioning component penetrates through the second positioning hole.

In a foldable display device of the present disclosure, the first torsion member has a first torsion end disposed at an end close to the first central component, and the second torsion member has a second torsion end disposed at an end close to the second central component; and the rotation mechanism further comprises a third torsion member connected with the first central component and the second central component, and the third torsion member comprises a third torsion end matched with the first torsion end and a fourth torsion end matched with the second torsion end.

In a foldable display device of the present disclosure, the first torsion end comprises a first cam structure, the second torsion end comprises a second cam structure, the third torsion end comprises a third cam structure, and the fourth torsion end comprises a fourth cam structure.

In a foldable display device of the present disclosure, the rotation mechanism further comprises a cover fixedly connected with the fixed member, a blocking member disposed at a side of the third torsion member away from the fixed member and fixedly connected with the cover, and a position-limiting member disposed between the first torsion member and the second torsion member, and the fixed member;
  an end of the first central component is connected to the fixed member or the position-limiting member, and the other end of the first central component is connected to the blocking member; and
  an end of the second central component is connected to the fixed member or the position-limiting member, and the other end of the second central component is connected to the blocking member.

In a foldable display device of the present disclosure, the first torsion member is rotatably connected with the first central component, and the second torsion member is rotatably connected with the second central component.

In a foldable display device of the present disclosure, the first torsion member has a first transmission portion disposed at an end close to the first central component, and the second torsion member has a second transmission portion disposed at an end close to the second central component.

In a foldable display device of the present disclosure, the rotation mechanism further comprises a first gear shaft and a second gear shaft disposed between the first central component and the second central component, the first gear shaft comprises a first gear portion, and the second gear shaft comprises a second gear portion;
  two opposite ends of a shaft body of the first gear shaft are respectively abutted against the position-limiting member and the blocking member, and two opposite ends of a shaft body of the second gear shaft are respectively abutted against the position-limiting member and the blocking member; and
  the first gear portion and the second gear portion are engaged with each other.

In a foldable display device of the present disclosure, the first transmission portion comprises a third gear portion, and the third gear portion is engaged with the first gear portion; and
  the second transmission portion comprises a fourth gear portion, and the fourth gear portion is engaged with the second gear portion.

In a foldable display device of the present disclosure, the rotation mechanism further comprises a first elastic member and a second elastic member;
  the first elastic member penetrates through the first central component and the second elastic member penetrates through the second central component, or, the first elastic member penetrates through the shaft body of the first gear shaft and the second elastic member penetrates through the shaft body of the second gear shaft; and
  two opposite ends of the first elastic member are respectively abutted against the third torsion member and the blocking member, and two opposite ends of the second elastic member are respectively abutted against the third torsion member and the blocking member.

In a foldable display device of the present disclosure, the first elastic member comprises a spring component, and the second elastic member comprises a spring component.

In a foldable display device of the present disclosure, the first central component and the second central component are rotatable with respect to the fixed member;
  the first torsion member is connected with the first central component, and the first central component is rotated by a rotation of the first torsion member; and
  the second torsion member is connected with the second central component, and the second central component is rotated by a rotation of the second torsion member.

In a foldable display device of the present disclosure, a shaft body of the first central component, which is connected to the first torsion member, has a first square surface, the first torsion member comprises a first transmission hole connected with the first central component, and the first transmission hole has a first square hole matched with the first square surface; and
  a shaft body of the second central component, which is connected to the second torsion member, has a second square surface, the second torsion member comprises a second transmission hole connected with the second central component, and the second transmission hole has a second square hole matched with the second square surface.

In a foldable display device of the present disclosure, the first central component comprises a third gear portion, and the second central component comprises a fourth gear portion;
  the foldable display device further comprises a first gear shaft and a second gear shaft disposed between the first central component and the second central component, the first gear shaft comprises a first gear portion engaged with the third gear portion, the second gear shaft comprises a second gear portion engaged with the fourth gear portion, and the first gear portion is engaged with the second gear portion; and
  two opposite ends of a shaft body of the first gear shaft are respectively abutted against the fixed member and the blocking member, and two opposite ends of a shaft body of the second gear shaft are respectively abutted against the fixed member and the blocking member.

In a foldable display device of the present disclosure, the position-limiting member has an accommodating groove defined by a side close to the fixed member, the first gear portion, the second gear portion, the third gear portion, and the fourth gear portion are located in the accommodating groove.

In a foldable display device of the present disclosure, the rotation mechanism further comprises a first elastic member and a second elastic member;
  the first elastic member penetrates through the first central component and the second elastic member penetrates through the second central component, or, the first elastic member penetrates through the shaft body of the first gear shaft and the second elastic member penetrates through the shaft body of the second gear shaft; and
  two opposite ends of the first elastic member are respectively abutted against the third torsion member and the blocking member, and two opposite ends of the second elastic member are respectively abutted against the third torsion member and the blocking member.

In a foldable display device of the present disclosure, the first rotating member comprises a first rotation portion, the fixed member comprises a first rotation groove slidingly matched with the first rotation portion, and the first rotation portion is connected with the first rotation groove through a first fixing pin; and the second rotating member comprises a second rotation portion, the fixed member comprises a second rotation groove slidingly matched with the second rotation portion, and the second rotation portion is connected with the second rotation groove through a second fixing pin.

The present disclosure further provides a foldable display device comprising a display panel and a rotation mechanism supporting the display panel, wherein the rotation mechanism comprises:

a fixed member;

a first rotating member and a second rotating member, wherein the first rotating member is rotatably connected with a side of the fixed member, the second rotating member is rotatably connected with the other side of the fixed member, the first rotating member comprises a first positioning component, and the second rotating member comprises a second positioning component;

a first central component and a second central component, wherein the first central component and the second central component are both disposed corresponding to a lateral end surface of the fixed member;

a first torsion member and a second torsion member, wherein the first torsion member is connected with the first central component, the second torsion member is connected with the second central component, the first torsion member and the second torsion member are both rotatable with respect to the fixed member, the first torsion member comprises a first guide rail, the first positioning component is connected to the first guide rail and is slidable with respect to the first guide rail, the second torsion member comprises a second guide rail, the second positioning component is connected to the second guide rail and is slidable with respect to the second guide rail, the first torsion member has a third gear portion disposed at a side close to the first central component, and the second torsion member has a fourth gear portion disposed at a side close to the second central component; and a first gear shaft and a second gear shaft disposed between the first central component and the second central component, wherein the first gear shaft comprises a first gear portion, the second gear shaft comprises a second gear portion, the first gear portion and the second gear portion are engaged with each other, the third gear portion is engaged with the first gear portion, and the fourth gear portion is engaged with the second gear portion.

Beneficial Effects:

The present disclosure provides a foldable display device. The foldable display device includes a display panel and a rotation mechanism supporting the display panel. The rotation mechanism includes a fixed member, a first rotating member and a second rotating member connected with the fixed member, a first central component and a second central component disposed corresponding to a lateral end surface of the fixed member, and a first torsion member and a second torsion member respectively connected with the first central component and the second central component. The first rotating member is slidably connected with a first guide rail on the first torsion member through a first positioning component. The second rotating member is slidably connected with a second guide rail on the second torsion member through a second positioning component. By disposing positioning components on the rotating members and the disposing guide rails slidably connected with the positioning components on the torsion members, the force of the positioning components on the guide rails acts on the upper end surfaces of the guide rails when the rotating members drive the torsion members to rotate in the present disclosure. Since the upper end surfaces of the guide rails correspond to the end surfaces of the torsion members supporting the display panel, the strength thereof is high, so the risk of deformation or breakage of the guide rails is reduced, and the reliability of the foldable display device is increased.

BRIEF DESCRIPTION OF THE SEVERAL VIEWS DRAWINGS

In order to more clearly illustrate the embodiments of the present disclosure or the technical solutions in prior arts, the following briefly introduces the accompanying drawings used in the embodiments. Obviously, the drawings in the following description merely show some of the embodiments of the present disclosure. As regards one of ordinary skill in the art, other drawings can be obtained in accordance with these accompanying drawings without making creative efforts.

DESCRIPTION OF SPECIFIC EMBODIMENTS OF THE INVENTION

Figure 1:
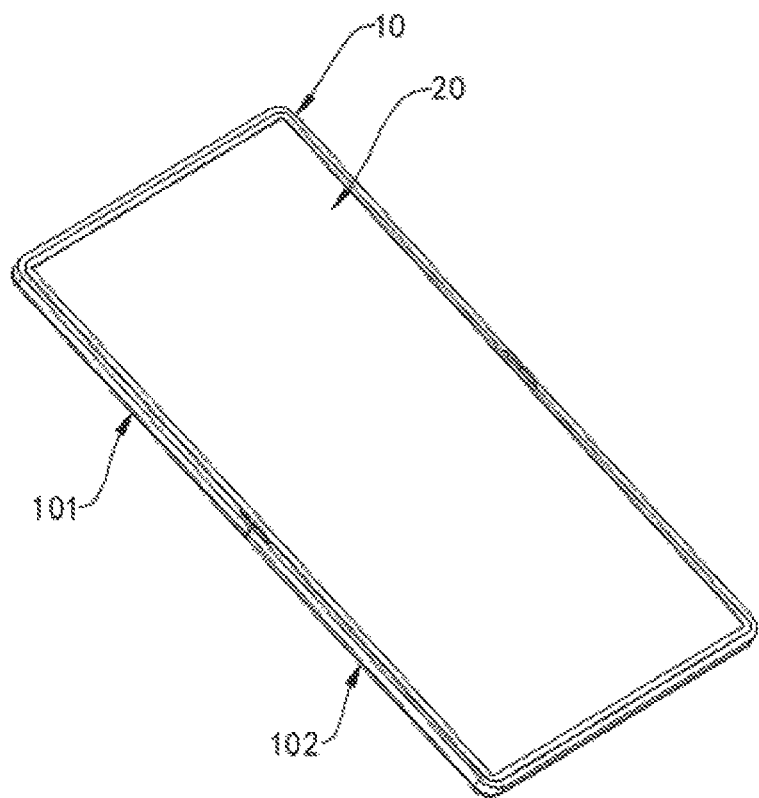
FIG. 1 is a schematic diagram of a foldable display device provided in an embodiment of the present disclosure in a flat state.

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, units with similar structures are indicated by the same reference number.

An embodiment of the present disclosure provides a foldable display device. The foldable display device includes a display panel and a rotation mechanism supporting the display panel. The rotation mechanism includes a fixed member, a first rotating member and a second rotating member connected with the fixed member, a first central component and a second central component disposed corresponding to a lateral end surface of the fixed member, and a first torsion member and a second torsion member respectively connected with the first central component and the second central component. The first rotating member is slidably connected with a first guide rail on the first torsion member through a first positioning component. The second rotating member is slidably connected with a second guide rail on the second torsion member through a second positioning component. By disposing positioning components on the rotating members and the disposing guide rails slidably connected with the positioning components on the torsion members, the force of the positioning components on the guide rails acts on the upper end surfaces of the guide rails when the rotating members drive the torsion members to rotate in the present disclosure. Since the upper end surfaces of the guide rails correspond to the end surfaces of the torsion members supporting the display panel, the strength thereof is high, so the risk of deformation or breakage of the guide rails is reduced, and the reliability of the foldable display device is increased.

The features of a foldable display device provided in the present disclosure are described below in connection with preferred embodiments.

Figure 2:
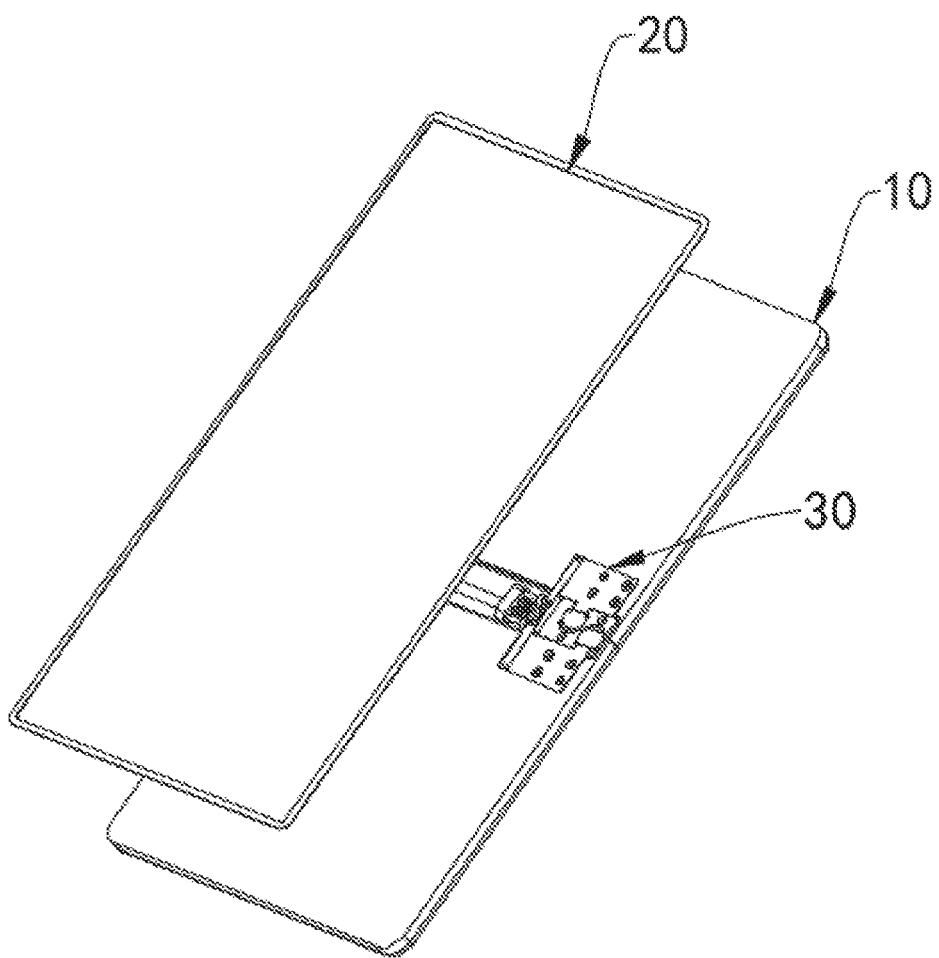
FIG. 2 is a disassembled diagram of a foldable display device provided in an embodiment of the present disclosure.
Figure 3:
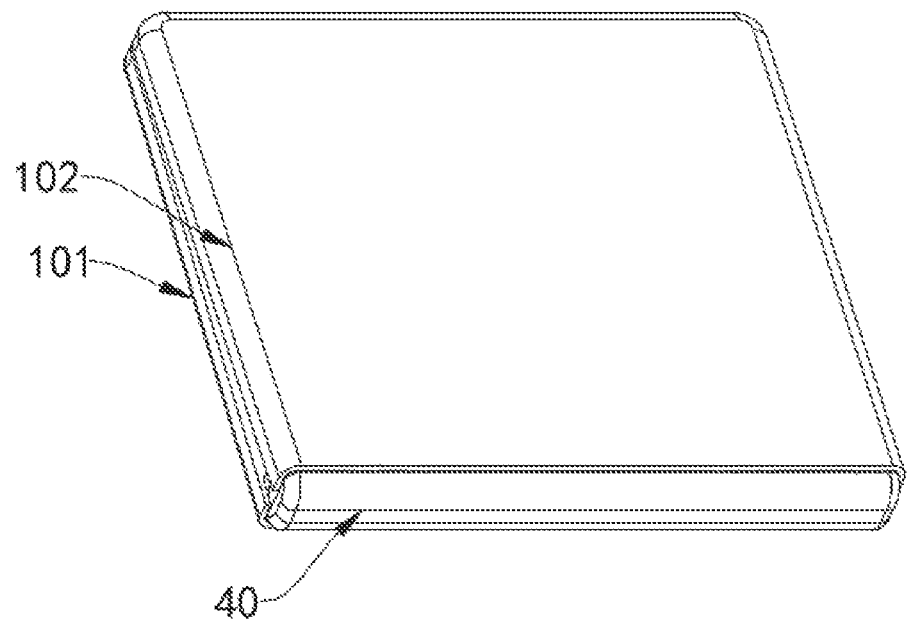
FIG. 3 is a schematic diagram of a foldable display device provided in an embodiment of the present disclosure in a folded state.

Please refer to FIG. 1 to FIG. 3. FIG. 1 is a schematic diagram of a foldable display device provided in an embodiment of the present disclosure in a flat state. FIG. 2 is a disassembled diagram of a foldable display device provided in an embodiment of the present disclosure. FIG. 3 is a schematic diagram of a foldable display device provided in an embodiment of the present disclosure in a folded state.

The foldable display device includes a housing 10, a rotation mechanism 30 disposed in a receiving groove of the housing 10, and a display panel 20 disposed at the same side of the housing 10 as the rotation mechanism 30. The housing 10 and the rotation mechanism 30 form a back supporting surface of the display panel 20 to support the display panel 20 to transform between a flat state and a fully folded state.

The housing 10 includes a first housing 101 and a second housing 102 disposed opposite to each other. The first housing 101 and the second housing 102 each has a recessed area in the junction area. The recessed area of the first housing 101 and the recessed area of the second housing 102 butt to form a receiving groove for receiving the rotation mechanism 30. The area of the first housing 101 except for the recessed area and the area of the second housing 102 except for the recessed area respectively form supporting planes of the display panel 20. Optionally, the first housing 101 and the second housing 102 have identical size and shape. The receiving groove is correspondingly disposed in a middle area of the housing 10.

The rotation mechanism 30 is disposed in the receiving groove enclosed by the first housing 101 and the second housing 102, and when the foldable display device is in a fully flat state, a surface of the rotation mechanism 30 facing the display panel 20 is coplanar with a surface of the housing 10 facing the display panel 20 to form a supporting plane of the display panel 20. A part of components of the rotation mechanism 30 is connected with the first housing 101, and another part of the components is connected with the second housing 102.

The rotation mechanism 30 further includes a cover 40 disposed at a side away from the display panel 20. When the foldable display device is in a flat state, the cover 40 is hidden in the receiving groove of the housing 10. When the foldable display device is in a folded state or a half-folded state, the cover 40 is exposed between the first housing 101 and the second housing 102. The cover 40 is used for shielding and protecting the components of the rotation mechanism 30.

The display panel 20 has a light-emitting surface and a non-light-emitting surface opposite to the light-emitting surface. The housing 10 and the rotation mechanism 30 are in contact with the non-light-emitting surface of the display panel 20 to support the display panel 20. The display panel 20 is flexible and bendable at least in an area corresponding to the rotation mechanism 30. The display panel 20 can be an organic light-emitting diode display panel or can be other forms of display panels having flexible characteristics.

The specifically structural features and working principles of the rotation mechanism 30 are described in detail in the present disclosure through the following embodiments.

Figure 4:
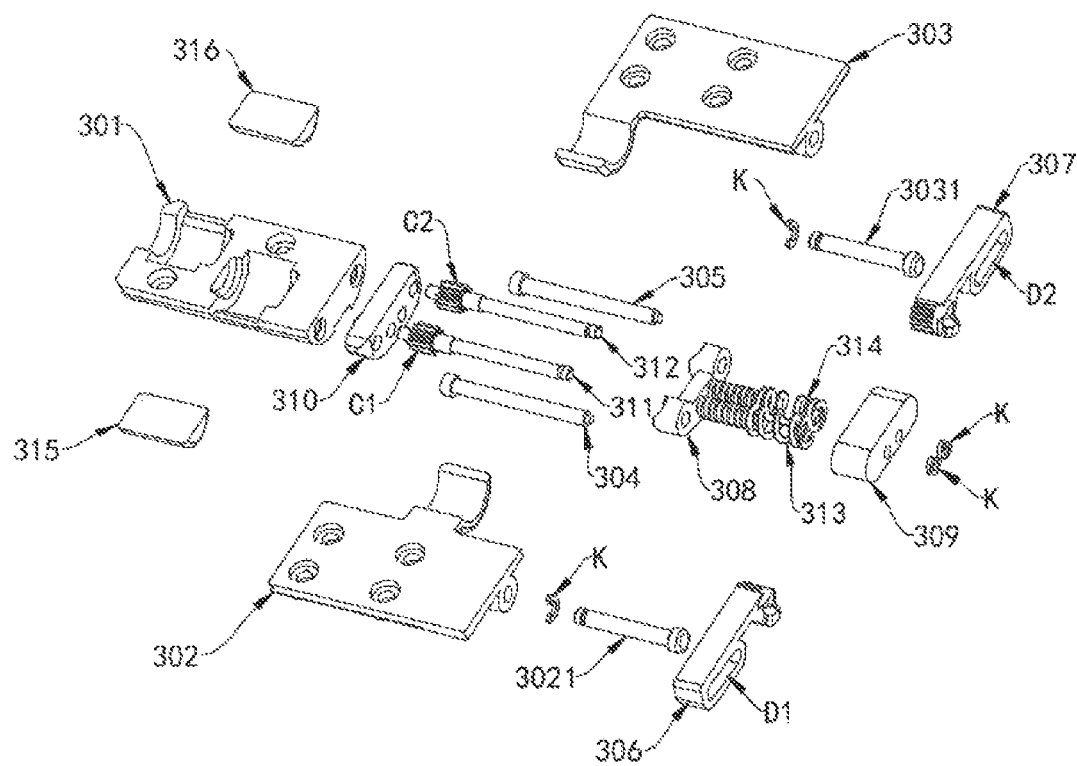
FIG. 4 is an exploded view of the first type of rotation mechanism provided in an embodiment of the present disclosure.

In an embodiment of the present disclosure, please refer to FIG. 4. FIG. 4 is an exploded view of the first type of rotation mechanism provided in an embodiment of the present disclosure. The rotation mechanism 30 includes a fixed member 301, a first rotating member 302 and a second rotating member 303 rotatably connected with two opposite sides of the fixed member 301, a first central component 304 and a second central component 305 disposed corresponding to a lateral end surface of the fixed member 301, and a first torsion member 306 and a second torsion member 307 respectively connected with the first central component 304 and the second central component 305. The first torsion member 306 and the second torsion member 307 are both rotatable with respect to the fixed member 301.

The first rotating member 302 includes a first positioning component 3021, the second rotating member 303 includes a second positioning component 3031, the first torsion member 306 includes a first guide rail D1, and the second torsion member 307 includes a second guide rail D2. The first positioning component 3021 is connected with the first guide rail D1, and the first positioning component 3021 is slidable on the first guide rail D1. The second positioning component 3031 is connected with the second guide rail D2, and the second positioning component 3031 is slidable on the second guide rail D2.

Furthermore, a thickness of at least half of an area of the first torsion member 306 located on the first guide rail D1 close to a side of the display panel 20 is greater than a thickness of the first torsion member 306 located on the first guide rail D1 away from the side of the display panel 20. A thickness of at least half of an area of the second torsion member 307 located on the second guide rail D2 close to the side of the display panel 20 is greater than a thickness of the second torsion member 307 located on the second guide rail D2 away from the side of the display panel 20.

In the present embodiment, through disposing positioning components on rotating members and disposing guide rails slidingly connected with positioning components on torsion members, the force of the positioning components on the guide rails acts on the upper end surfaces of the guide rails when the rotating members drive the torsion members to rotate, and the thickness and strength of the upper end surfaces of the guide rails are both greater than the lower end surfaces of the guide rails, so the deformation resistance of the guide rails is enhanced, and the reliability of the foldable display device is increased.

Figure 5:
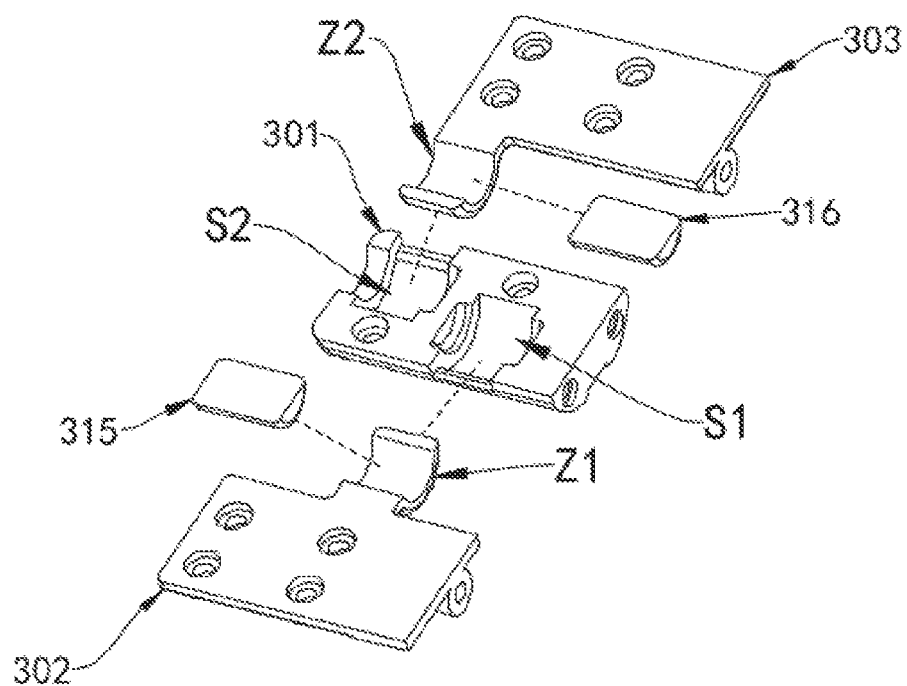
FIG. 5 is a schematic diagram of the connection between a fixed member, a first rotating member, and a second rotating member of the first type of rotation mechanism provided in an embodiment of the present disclosure.

Please refer to FIG. 4 and FIG. 5. FIG. 5 is a schematic diagram of the connection between a fixed member, a first rotating member, and a second rotating member of the first type of rotation mechanism provided in an embodiment of the present disclosure. The first rotating member 302 is connected with the fixed member 301 and is rotatable with respect to the fixed member 301. The second rotating member 303 is connected with the fixed member 301 and is rotatable with respect to the fixed member 301.

In specific, the fixed member 301 has a first rotation groove S1 and a second rotation groove S2 disposed thereon, the first rotating member 302 has a first rotation portion Z1, and the second rotating member 303 has a second rotation portion Z2. The first rotation portion Z1 is connected with the first rotation groove S1 through a first fixing pin 315 to implement a rotatable connection of the first rotating member 302 and the fixed member 301. The second rotation portion Z2 is connected with the second rotation groove S2 through a second fixing pin 316 to implement a rotatable connection of the second rotating member 303 and the fixed member 301.

Optionally, the first rotation groove S1 and the second rotation groove S2 can both be arc-shaped grooves. The first rotation portion Z1 and the second rotation portion Z2 can have arc-shaped surfaces corresponding to the arc-shaped grooves.

Figure 6:
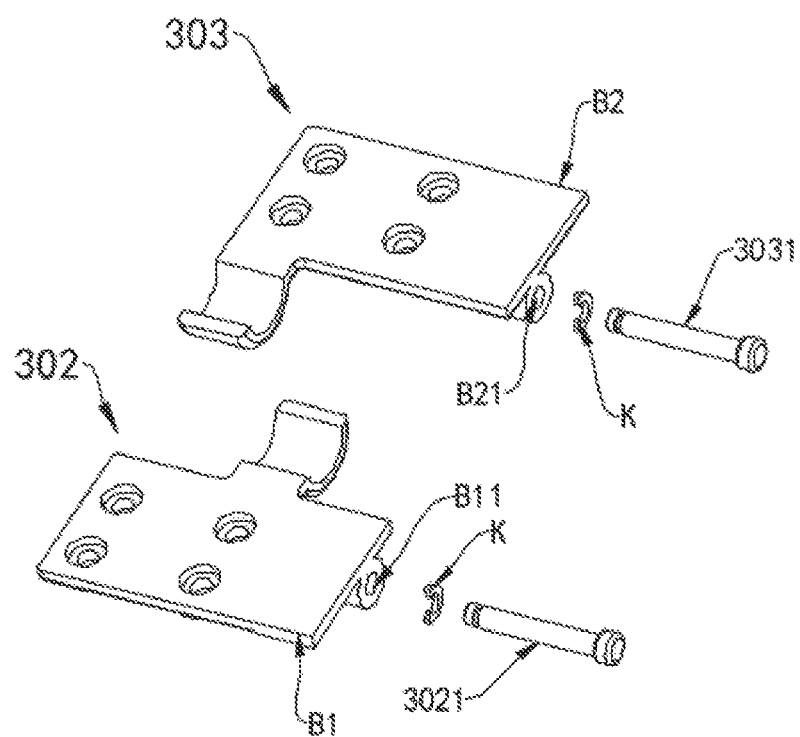
FIG. 6 is a schematic diagram of the structure of a first rotating member and a second rotating member of the first type of rotation mechanism provided in an embodiment of the present disclosure.

Please refer to FIG. 4 and FIG. 6. FIG. 6 is a schematic diagram of the structure of a first rotating member and a second rotating member of the first type of rotation mechanism provided in an embodiment of the present disclosure. The first rotating member 302 further includes a first supporting portion B1. The first positioning component 3021 connects the first supporting portion B1 and extends the first supporting portion B1 along a first direction. The second rotating member 303 includes a second supporting portion B2. The second positioning component 3031 connects the second supporting portion B2 and extends the second supporting portion B2 along the first direction.

Optionally, the first positioning component 3021 includes a positioning rod, the first supporting portion B1 has a first positioning hole B11 disposed thereon, the first positioning component 3021 penetrates through the first positioning hole B11, and a fastener K fixes the first positioning component 3021 on the first supporting portion B1.

The second positioning component 3031 includes a positioning rod, the second supporting portion B2 has a second positioning hole B21 disposed thereon, the second positioning component 3031 penetrates through the second positioning hole B21, and a fastener K fixes the second positioning component 3031 on the second supporting portion B2.

Figure 7:
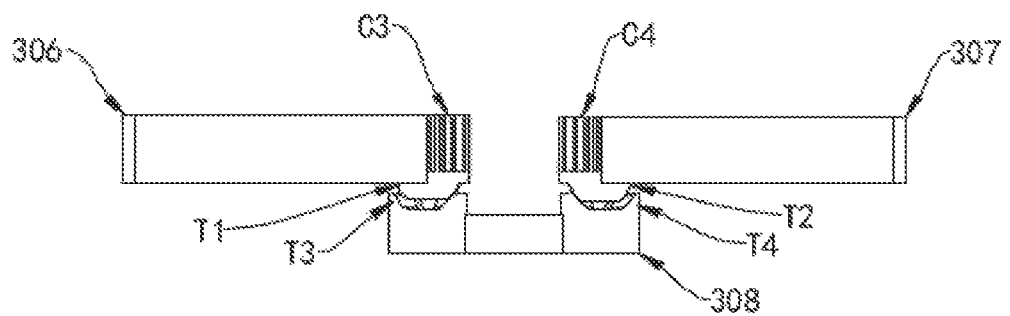
FIG. 7 is a first perspective view of a first torsion member, a second torsion member, and a third torsion member of the first type of rotation mechanism provided in an embodiment of the present disclosure.
Figure 8:
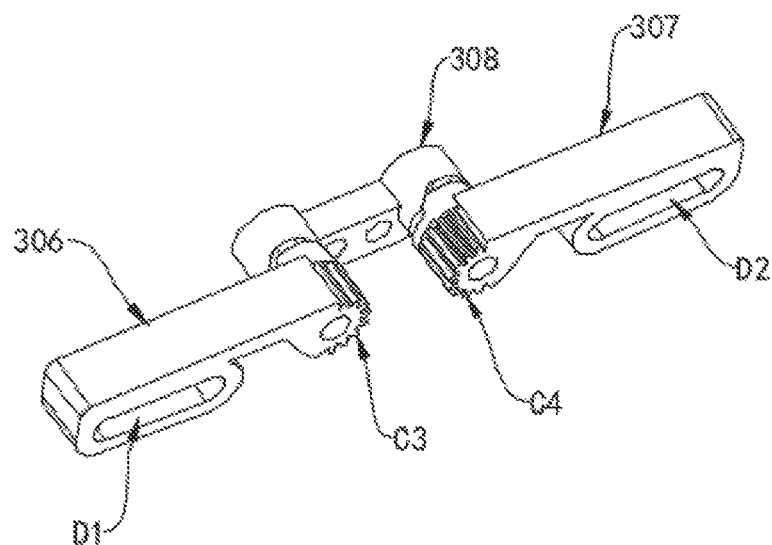
FIG. 8 is a second perspective view of a second torsion member and a third torsion member of the first type of rotation mechanism provided in an embodiment of the present disclosure.
Figure 9:
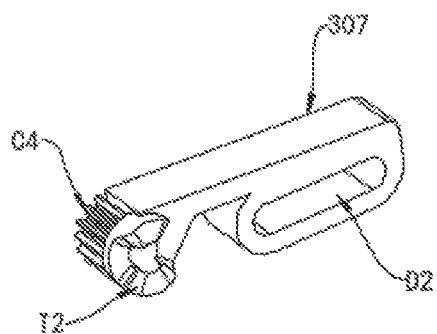
FIG. 9 is a schematic diagram of the structure of a second torsion member provided in an embodiment of the present disclosure.

Please refer to FIG. 4 and FIG. 7 to FIG. 9. FIG. 7 is a first perspective view of a first torsion member, a second torsion member, and a third torsion member of the first type of rotation mechanism provided in an embodiment of the present disclosure. FIG. 8 is a second perspective view of a second torsion member and a third torsion member of the first type of rotation mechanism provided in an embodiment of the present disclosure. FIG. 9 is a schematic diagram of the structure of a second torsion member provided in an embodiment of the present disclosure.

The first rotating member 302 is slidably connected with the first torsion member 306 through the first positioning component 3021. The second rotating member 203 is slidably connected with the second torsion member 307 through the second positioning component 3031. The first rotating member 302 and the first torsion member 306 are arranged along the first direction. The second rotating member 303 and the second torsion member 307 are arranged along the first direction.

In specific, the first torsion member 306 has a first guide rail D1 disposed thereon. The first positioning component 3021 connects the first guide rail D1 and can slide along the first guide rail D1. The second torsion member 307 has a second guide rail D2 disposed thereon. The second positioning component 3031 connects the second guide rail D2 and can slide along the second guide rail D2.

Optionally, a second direction, which is perpendicular to the first direction, exists on a supporting plane formed by the first rotating member 302 and the first torsion member 306. The first guide rail D1 extends along the second direction. The first positioning component 3021 is slidable in the first guide rail D1 along the second direction. The second guide rail D2 extends along the second direction. The second positioning component 3031 is slidable in the second guide rail D2 along the second direction.

Optionally, the first guide rail D1 can include a groove structure or a hole structure, and the second guide rail can also include a groove structure or a hole structure.

The first central component 304 and the second central component 305 are both disposed at a lateral end surface of the fixed member 301. An end of the first torsion member 306 away from the first guide rail D1 is rotatably connected with the first central component 304. An end of the second torsion member 307 away from the second guide rail D2 is rotatably connected with the second central component 305.

Optionally, the first central component 304 and the second central component are rod-shaped structures parallel to each other. An end of the first central component 304 can be fixedly connected or movably connected with a lateral end surface of the fixed member 301. An end of the second central component 305 can be fixedly connected or movably connected with a lateral end surface of the fixed member 301.

The first torsion member 306 has a first torsion end T1 disposed at an end close to the first central component 304. The second torsion member 307 has a second torsion end disposed at an end close to the second central component 305. The rotation mechanism 30 further includes a third torsion member 308 connected with the first central component 304 and the second central component 305, and the third torsion member 308 includes a third torsion end T3 matched with the first torsion end T1 and a fourth torsion end T4 matched with the second torsion end T2.

The third torsion member 308 can slide along the first central component 304 and the second central component 305. The first torsion member 306 and the second torsion member 307 are rotatable with respect to the third torsion member 308. During the rotating process of the first torsion member 306 and the second torsion member 307 relative to the third torsion member 308, torsion force is exerted to the first torsion member 306 and the second torsion member 307 by using the matching relation between the first torsion end T1 and the third torsion end T3 and the matching relation between the second torsion end T2 and the fourth torsion end T4 to implement flattening drive and folding drive of the rotation mechanism 30.

Optionally, the first torsion end T1 includes a first cam structure, the second torsion end T2 includes a second cam structure, the third torsion end T3 includes a third cam structure, and the fourth torsion end T4 includes a fourth cam structure. The first cam structure and the second cam structure have two protrusion portions disposed thereon at equal interval. The third cam structure and the fourth cam structure have groove portions disposed corresponding to the protrusion portions on the first cam structure and the second cam structure. By using the matching relation between the protrusion portions and the groove portions, the rotation mechanism 30 is implemented to form a closing torsion when it is closed to a range of 0-30 degrees during a closing process, form an unfolding torsion when it is unfolded to a range of 150-180 degrees during an unfolding process, and form no torsion in a range of 30-150 degrees, thereby implementing automatic closing and automatic unfolding with a certain angle range.

Figure 10:
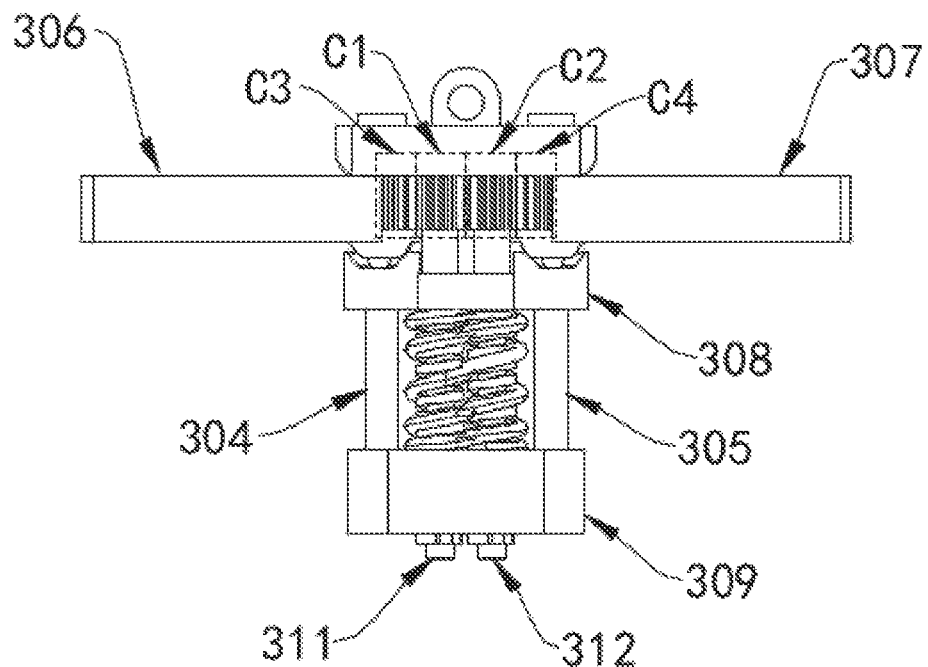
FIG. 10 is a schematic diagram of the assembled structure of the first type of rotation mechanism provided in an embodiment of the present disclosure.

Please refer to FIG. 2 to FIG. 4 and FIG. 7 to FIG. 10. FIG. 10 is a schematic diagram of the assembled structure of the first type of rotation mechanism provided in an embodiment of the present disclosure.

The rotation mechanism 30 further includes a cover 40 fixedly connected with the fixed member 301, a blocking member 309 disposed at a side of the third torsion member 308 away from the fixed member 301 and fixedly connected with the cover 40, a position-limiting member 310 disposed between the first torsion member 306 and the second torsion member 307, and the fixed member 301, a first gear shaft 311 and a second gear shaft 312 disposed between the first central component 304 and the second central component 305, and a first elastic member 313 and a second elastic member 314 abutted against the third torsion member 308 and the blocking member 309. The position-limiting member 310 is fixedly connected with the fixed member 301.

An end of the first central component 304 is connected to a groove hole of the fixed member 301 through an opening of the position-limiting member 310, and the other end of the first central component 304 is connected to the blocking member 309 by penetrating through an opening of the third torsion member 308. Alternatively, an end of the first central component 304 is connected to a groove hole of the position-limiting member 310, and the other end of the first central component 304 is connected to the blocking member 309 by penetrating through an opening of the third torsion member 308.

An end of the second central component 305 is connected to a groove hole of the fixed member 301 through an opening of the position-limiting member 310, and the other end of the second central component 305 is connected to the blocking member 309 by penetrating through an opening of the third torsion member 308. Alternatively, an end of the second central component 305 is connected to a groove hole of the position-limiting member 310, and the other end of the second central component 305 is connected to the blocking member 309 by penetrating through an opening of the third torsion member 308.

The first torsion member 306 has a first transmission portion disposed at an end close to the first central component 304, the second torsion member 307 has a second transmission portion disposed at an end close to the second central component 305, the first transmission portion includes a third gear portion C3, and the second transmission portion includes a fourth gear portion C4.

The first gear shaft 311 includes a first gear portion C1. The first gear portion C1 is engaged with the third gear portion C3 of the first torsion member 306. An end of a shaft body of the first gear shaft 311 is connected to a groove hole of the position-limiting member 310, and the other end of the shaft body of the first gear shaft 311 is connected to the blocking member 309 by penetrating through an opening of the third torsion member 308.

The second gear shaft 312 includes a second gear portion C2. The second gear portion C2 is engaged with the fourth gear portion C4 of the second torsion member 307. An end of a shaft body of the second gear shaft 312 is connected to a groove hole of the position-limiting member 310, and the other end of the shaft body of the second gear shaft 312 is connected to the blocking member 309 by penetrating through an opening of the third torsion member 308.

Optionally, shaft bodies of the first gear shaft 311 and the second gear shaft 312 each connects the blocking member 309 through a fastener K.

The first gear shaft 311 and the second gear shaft 312 are both rotatable. The first gear portion C1 and the second gear portion C2 are engaged with each other.

In the present embodiment, through disposing the third gear portion C3 on the first torsion member 306 and disposing the fourth gear portion C4 on the second torsion member 307, the motional synchronization of the first torsion member 306, the first gear shaft 311, the second gear shaft 312, and the second torsion member 307 is enhanced.

The first elastic member 313 and the second elastic member 314 respectively penetrate through the first central component 304 and the second central component 305, two opposite ends of the first elastic member 313 are respectively abutted against the third torsion member 308 and the blocking member 309, and two opposite ends of the second elastic member 314 are respectively abutted against the third torsion member 308 and the blocking member 309.

Alternatively, the first elastic member 313 and the second elastic member 314 respectively penetrate through a shaft body of the first gear shaft 311 and a shaft body of the second gear shaft 312, two opposite ends of the first elastic member 313 are respectively abutted against the third torsion member 308 and the blocking member 309, and two opposite ends of the second elastic member 314 are respectively abutted against the third torsion member 308 and the blocking member 309.

In addition, the rotation mechanism 30 can further include more elastic members. These elastic members respectively penetrate through the first central component 304, the second central component 305, a shaft body of the first gear shaft 311, and a shaft body of the second gear shaft 312, and two opposite ends of these elastic members respectively abut against the third torsion member 308 and the blocking member 309.

Optionally, the first elastic member 313 includes a spring component, and the second elastic member 314 includes a spring component.

Figure 11:
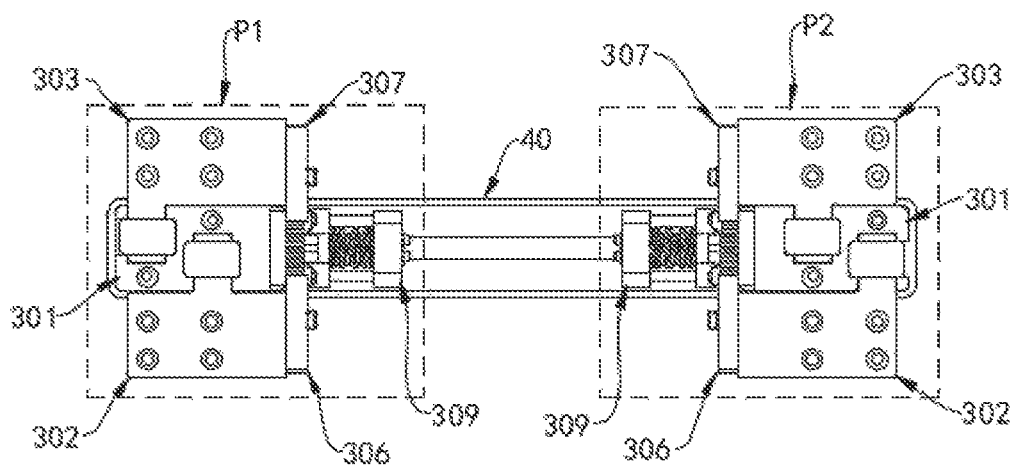
FIG. 11 is a first view of the first type of rotation mechanism provided in an embodiment of the present disclosure in a flat state.
Figure 12:
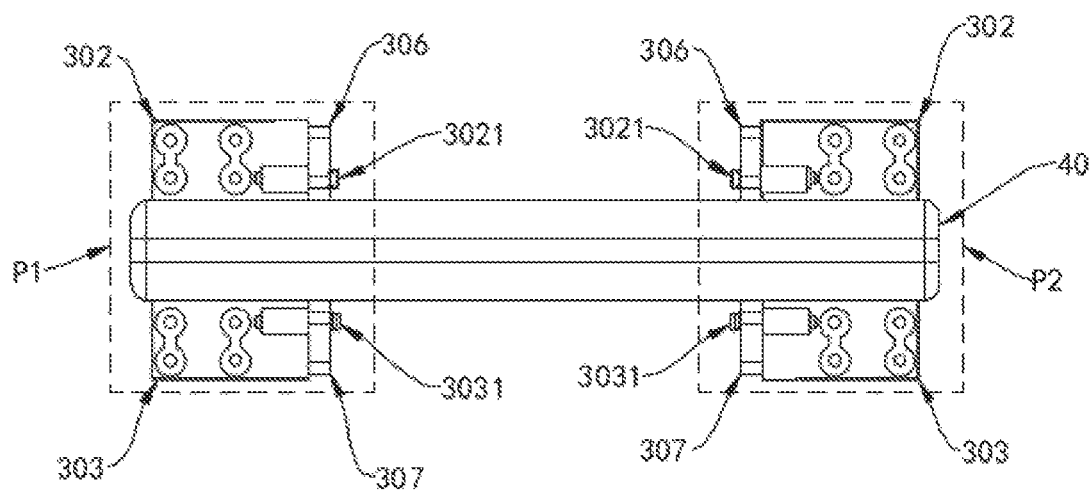
FIG. 12 is a second view of the first type of rotation mechanism provided in an embodiment of the present disclosure in a flat state.
Figure 13:
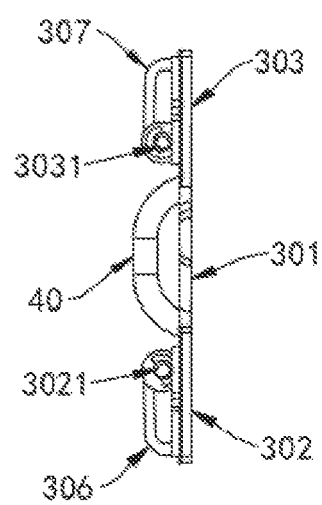
FIG. 13 is a third view of the first type of rotation mechanism provided in an embodiment of the present disclosure in a flat state.

Please refer to FIG. 2 to FIG. 4 and FIG. 11 to FIG. 13. FIG. 11 is a first view of the first type of rotation mechanism provided in an embodiment of the present disclosure in a flat state. FIG. 12 is a second view of the first type of rotation mechanism provided in an embodiment of the present disclosure in a flat state. FIG. 13 is a third view of the first type of rotation mechanism provided in an embodiment of the present disclosure in a flat state.

The rotation mechanism 30 includes a first part P1 and a second part P2 disposed symmetrically. The first part P1 and the second part P2 both have constituent components shown in FIG. 4.

When the rotation mechanism is in a flat state, surfaces of the first rotating member 302 and the second rotating member 303 close to a side of the display panel 20 are flushed or nearly flushed, thereby providing a flat supporting surface for the display panel 20 in an unfolded state.

Meanwhile, since the radiuses of rotations of the first rotating member 302 and the first torsion member 306 are different, the first positioning component 3021 is located at an end of the first guide rail D1 close to the first central component 304 and the second positioning component 3031 is located at an end of the second guide rail close to the second central component 305 in a flat state.

Figure 14:
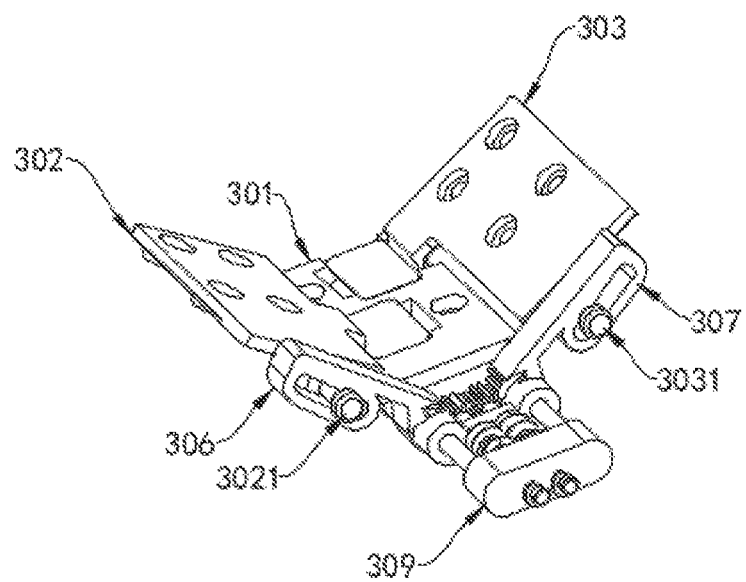
FIG. 14 is a schematic diagram of the structure of the first type of rotation mechanism provided in an embodiment of the present disclosure during a folding process.
Figure 15:
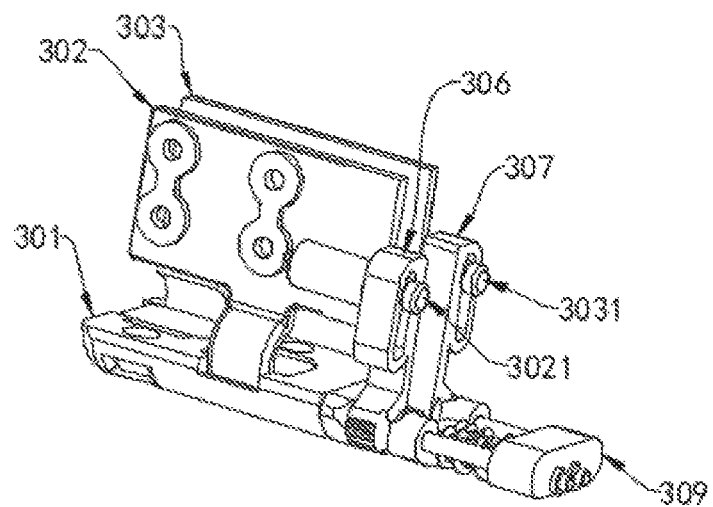
FIG. 15 is a schematic diagram of the first type of rotation mechanism provided in an embodiment of the present disclosure in a folded state.
Figure 16:
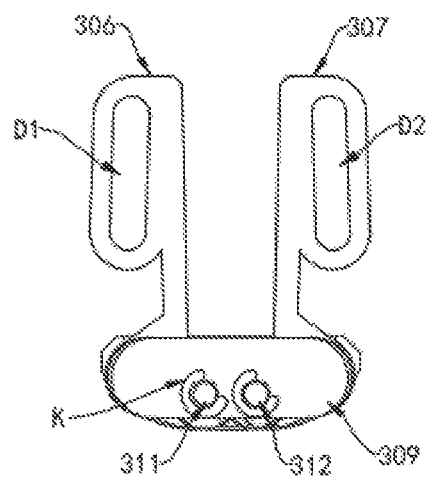
FIG. 16 is a schematic diagram of the partial structure of the first type of rotation mechanism provided in an embodiment of the present disclosure in a folded state.

Please refer to FIG. 2 to FIG. 4 and FIG. 14 to FIG. 16. FIG. 14 is a schematic diagram of the structure of the first type of rotation mechanism provided in an embodiment of the present disclosure during a folding process. FIG. 15 is a schematic diagram of the first type of rotation mechanism provided in an embodiment of the present disclosure in a folded state. FIG. 16 is a schematic diagram of the partial structure of the first type of rotation mechanism provided in an embodiment of the present disclosure in a folded state.

During the process of transforming from a flat state into a folded state of the rotation mechanism 30, i.e., during the folding process, the first positioning component 3021 gradually slides from an end of the first guide rail D1 close to the first central component 304 to an end away from the first central component 304, and the second positioning component 3031 gradually slides from an end of the second guide rail D2 close to the second central component 305 to an end away from the second central component 305.

During the folding process of the rotation mechanism 30, the first rotating member 302 drives the first torsion member 306 to rotate through the first positioning component 3021, the second rotating member 303 drives the second torsion member 307 to rotate through the second positioning component 3031, the force of the first positioning component 3021 on the first guide rail D1 acts on an upper end surface inside the first guide rail D1, and the force of the second positioning component 3031 on the second guide rail D2 acts on an upper end surface inside the second guide rail D2. Because the upper end surface of the first guide rail D1 is an end surface corresponding to the first torsion member 306 supporting the display panel 20, the strength thereof is high, and the deformation or breakage does not easily occur, thereby enhancing the reliability of the first guide rail D1. The upper end surface of the second guide rail D2 is an end surface corresponding to the second torsion member 307 supporting the display panel 20, the strength thereof is high, and the deformation or breakage does not easily occur, thereby enhancing the reliability of the second guide rail D2.

When the rotation mechanism 30 is in a folded state, the first positioning component 3021 is located at or close to an end of the first guide rail D1 away from the first central component 304, and the second positioning component 3031 is located at or close to an end of the second guide rail D2 away from the second central component 305.

Figure 17:
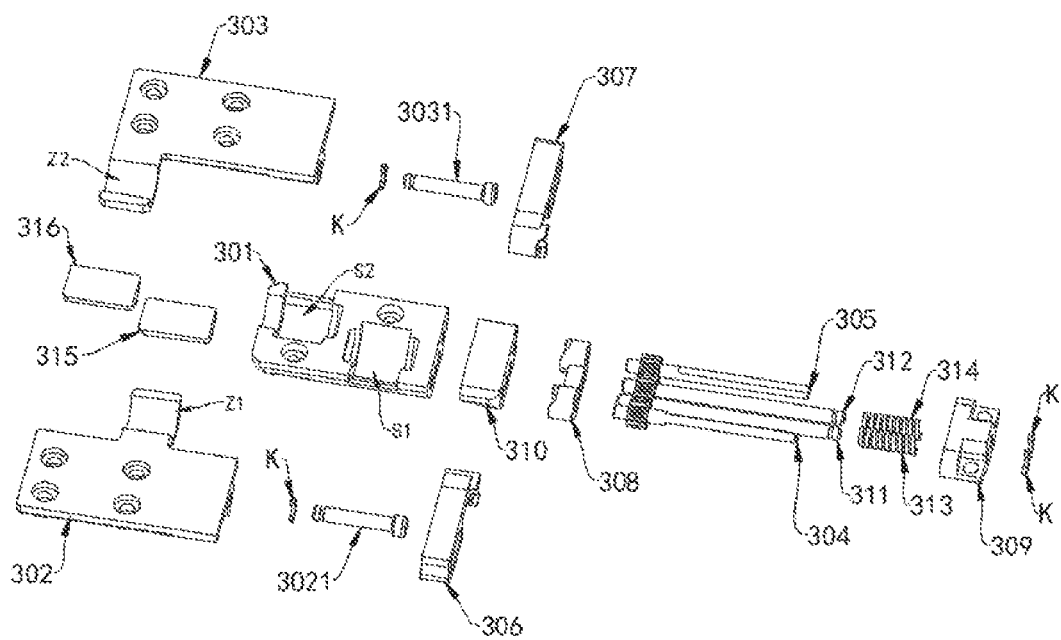
FIG. 17 is an exploded view of the second type of rotation mechanism provided in an embodiment of the present disclosure

In another embodiment of the present disclosure, please refer to FIG. 17. FIG. 17 is an exploded view of the second type of rotation mechanism provided in an embodiment of the present disclosure. It should be noted that a rotation mechanism provided in the present embodiment has identical or similar features as the rotation mechanism provided in the embodiment mentioned above. The structural features of the rotation mechanism of the present embodiment are described below, with reference to the description of the embodiment mentioned above for the parts not described in detail.

The rotation mechanism 30 includes a fixed member 301, a first rotating member 302 and a second rotating member 303 rotatably connected with two opposite sides of the fixed member 301, a first central component 304 and a second central component 305 disposed corresponding to a lateral end surface of the fixed member 301, and a first torsion member 306 and a second torsion member 307 respectively connected with the first central component 304 and the second central component 305. The first torsion member 306 and the second torsion member 307 are both rotatable with respect to the fixed member 301. The first central component 304 is rotated by a rotation of the first torsion member 306, and the second central component 305 is rotated by a rotation of the second torsion member 307.

The first rotating member 302 includes a first positioning component 3021, the second rotating member 303 includes a second positioning component 3031, the first torsion member 306 includes a first guide rail D1, and the second torsion member 307 includes a second guide rail D2. The first positioning component 3021 is connected with the first guide rail D1, and the first positioning component 3021 is slidable on the first guide rail D1. The second positioning component 3031 is connected with the second guide rail D2, and the second positioning component 3031 is slidable on the second guide rail D2. In the present embodiment, by disposing positioning components on rotating members and disposing guide rails slidingly connected with positioning components on torsion members, the force of the positioning components on the guide rails acts on the upper end surfaces of the guide rails when the rotating members drive the torsion members to rotate, so the deformation resistance of the guide rails is enhanced, and the reliability of the foldable display device is increased.

The first rotating member 302 is connected with the fixed member 301 and is rotatable with respect to the fixed member 301. The second rotating member 303 is connected with the fixed member 301 and is rotatable with respect to the fixed member 301.

In specific, the fixed member 301 has a first rotation groove S1 and a second rotation groove S2 disposed thereon, the first rotating member 302 has a first rotation portion Z1, and the second rotating member 303 has a second rotation portion Z2. The first rotation portion Z1 is connected with the first rotation groove S1 through a first fixing pin 315 to implement a rotatable connection of the first rotating member 302 and the fixed member 301. The second rotation portion Z2 is connected with the second rotation groove S2 through a second fixing pin 316 to implement a rotatable connection of the second rotating member 303 and the fixed member 301.

Optionally, the first rotation groove S1 and the second rotation groove S2 can both be arc-shaped grooves. The first rotation portion Z1 and the second rotation portion Z2 can have arc-shaped surfaces corresponding to the arc-shaped grooves.

The first rotating member 302 further includes a first supporting portion. The first positioning component 3021 connects the first supporting portion. The second rotating member 303 includes a second supporting portion. The second positioning component 3031 connects the second supporting portion.

Optionally, the first positioning component 3021 includes a positioning rod, the first supporting portion has a first positioning hole disposed thereon, the first positioning component 3021 penetrates through the first positioning hole, and a fastener K fixes the first positioning component 3021 on the first supporting portion.

The second positioning component 3031 includes a positioning rod, the second supporting portion has a second positioning hole disposed thereon, the second positioning component 3031 penetrates through the second positioning hole, and a fastener K fixes the second positioning component 3031 on the second supporting portion.

Figure 18:
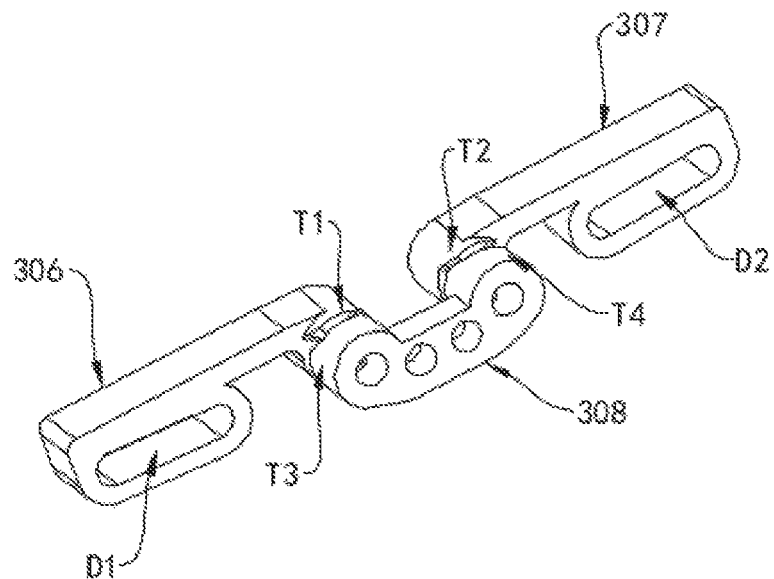
FIG. 18 is a schematic diagram of the assembly of a first torsion member, a second torsion member, and a third torsion member of the second type of rotation mechanism provided in an embodiment of the present disclosure.
Figure 19:
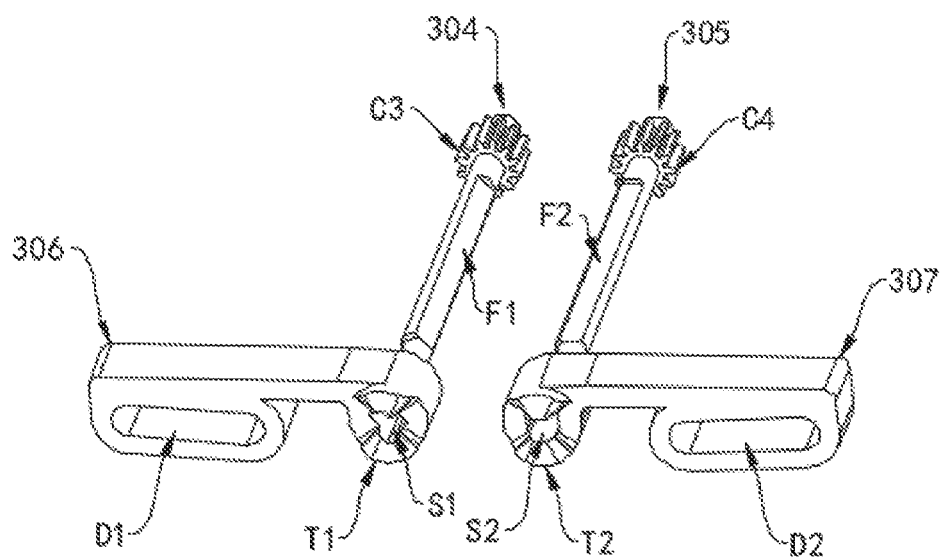
FIG. 19 is a schematic diagram of the assembly of a first torsion member, a second torsion member, a first central component, and a second central component of the second type of rotation mechanism provided in an embodiment of the present disclosure.

Please refer to FIG. 17 to FIG. 19. FIG. 18 is a schematic diagram of the assembly of a first torsion member, a second torsion member, and a third torsion member of the second type of rotation mechanism provided in an embodiment of the present disclosure. FIG. 19 is a schematic diagram of the assembly of a first torsion member, a second torsion member, a first central component, and a second central component of the second type of rotation mechanism provided in an embodiment of the present disclosure.

The first torsion member 306 has a first guide rail D1 disposed thereon. The first positioning component 3021 connects the first guide rail D1 and can slide along the first guide rail D1. The second torsion member 307 has a second guide rail D2 disposed thereon. The second positioning component 3031 connects the second guide rail D2 and can slide along the second guide rail D2.

Optionally, the first guide rail D1 can include a groove structure or a hole structure, and the second guide rail can also include a groove structure or a hole structure.

An end of the first torsion member 306 away from the first guide rail D1 is connected with the first central component 304. An end of the second torsion member 307 away from the second guide rail D2 is connected with the second central component 305. The first central component 304 can be rotated by a rotation of the first torsion member 306, and the second central component 305 can be rotated by a rotation of the second torsion member 307.

Optionally, the first central component 304 and the second central component are rod-shaped structures parallel to each other. An end of the first central component 304 can be rotatably connected with a lateral end surface of the fixed member 301. An end of the second central component 305 can be rotatably connected with a lateral end surface of the fixed member 301.

Optionally, a shaft body of the first central component 304, which is connected to the first torsion member 306, has a first square surface F1. The first torsion member 306 includes a first transmission hole S1 connected with the first central component 304. The first transmission hole S1 has a first square hole matched with the first square surface F1, such that the first central component 304 is rotated by a rotation of the first torsion member 306.

A shaft body of the second central component 305, which is connected to the second torsion member 307, has a second square surface F2. The second torsion member 307 includes a second transmission hole S2 connected with the second central component 305. The second transmission hole S2 has a second square hole matched with the second square surface F2, such that the second central component 305 is rotated by a rotation of the second torsion member 307.

The first torsion member 306 has a first torsion end T1 disposed at an end close to the first central component 304. The second torsion member 307 has a second torsion end disposed at an end close to the second central component 305. The rotation mechanism 30 further includes a third torsion member 308 connected with the first central component 304 and the second central component 305, and the third torsion member 308 includes a third torsion end T3 matched with the first torsion end T1 and a fourth torsion end T4 matched with the second torsion end T2.

The third torsion member 308 can slide along the first central component 304 and the second central component 305. The first torsion member 306 and the second torsion member 307 are rotatable with respect to the third torsion member 308. During the rotating process of the first torsion member 306 and the second torsion member 307 relative to the third torsion member 308, torsion force is exerted to the first torsion member 306 and the second torsion member 307 by using the matching relation between the first torsion end T1 and the third torsion end T3 and the matching relation between the second torsion end T2 and the fourth torsion end T4 to implement flattening drive and folding drive of the rotation mechanism 30.

Optionally, the first torsion end T1 includes a first cam structure, the second torsion end T2 includes a second cam structure, the third torsion end T3 includes a third cam structure, and the fourth torsion end T4 includes a fourth cam structure. The first cam structure and the second cam structure have two protrusion portions disposed thereon at equal interval. The third cam structure and the fourth cam structure have groove portions disposed corresponding to the protrusion portions on the first cam structure and the second cam structure. By using the matching relation between the protrusion portions and the groove portions, the rotation mechanism 30 is implemented to form a closing torsion when it is closed to a range of 0-30 degrees during a closing process, form an unfolding torsion when it is unfolded to a range of 150-180 degrees during an unfolding process, and form no torsion in a range of 30-150 degrees, thereby implementing automatic closing and automatic unfolding with a certain angle range.

Figure 20:
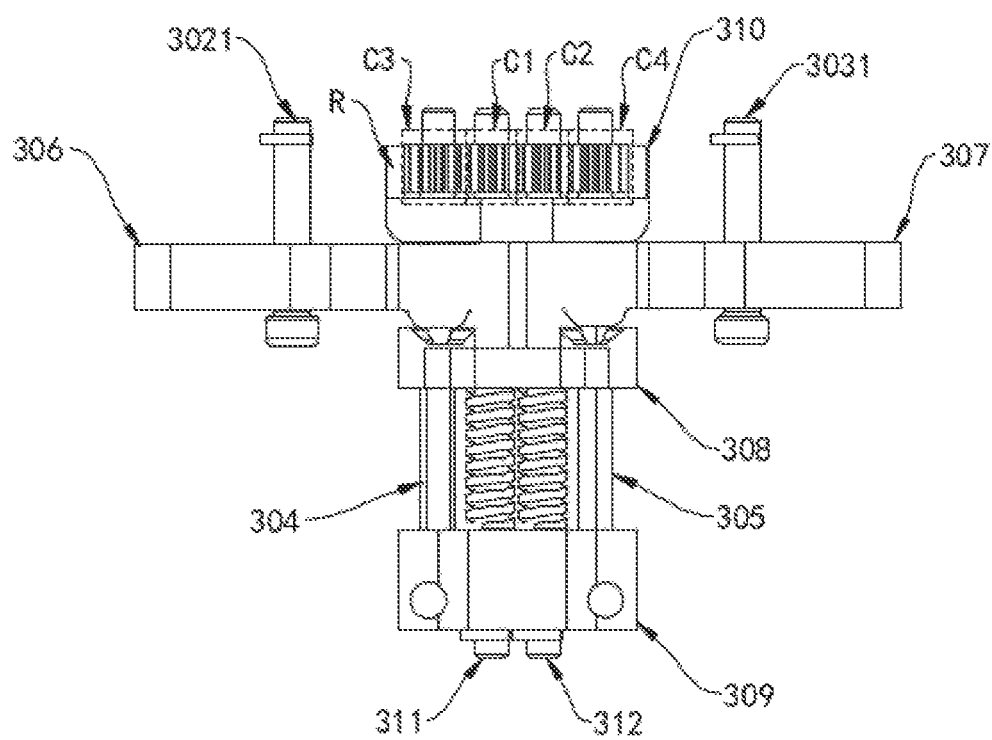
FIG. 20 is a schematic diagram of the assembled structure of the second type of rotation mechanism provided in an embodiment of the present disclosure.

Please refer to FIG. 2, FIG. 3, and FIG. 17 to FIG. 20. FIG. 20 is a schematic diagram of the assembled structure of the second type of rotation mechanism provided in an embodiment of the present disclosure.

The rotation mechanism 30 further includes a cover 40 fixedly connected with the fixed member 301, a blocking member 309 disposed at a side of the third torsion member 308 away from the fixed member 301 and fixedly connected with the cover 40, a position-limiting member 310 disposed between the first torsion member 306 and the second torsion member 307, and the fixed member 301, a first gear shaft 311 and a second gear shaft 312 disposed between the first central component 304 and the second central component 305, and a first elastic member 313 and a second elastic member 314 abutted against the third torsion member 308 and the blocking member 309.

An end of the first central component 304 is connected to a groove hole of the fixed member 301 through an opening of the position-limiting member 310, and the other end of the first central component 304 is connected to the blocking member 309 by penetrating through an opening of the third torsion member 308.

An end of the second central component 305 is connected to a groove hole of the fixed member 301 through an opening of the position-limiting member 310, and the other end of the second central component 305 is connected to the blocking member 309 by penetrating through an opening of the third torsion member 308.

The first central component 304 includes a third gear portion C3, and the second central component 305 includes a fourth gear portion C4.

The first gear shaft 311 includes a first gear portion C1. The first gear portion C1 is engaged with the third gear portion C3. An end of a shaft body of the first gear shaft 311 is connected to the fixed member 301, and the other end of the shaft body of the first gear shaft 311 is connected to the blocking member 309 by penetrating through an opening of the third torsion member 308.

The second gear shaft 312 includes a second gear portion C2. The second gear portion C2 is engaged with the fourth gear portion C4. An end of a shaft body of the second gear shaft 312 is connected to the fixed member 301, and the other end of the shaft body of the second gear shaft 312 is connected to the blocking member 309 by penetrating through an opening of the third torsion member 308.

Optionally, shaft bodies of the first gear shaft 311 and the second gear shaft 312 each connects the blocking member 309 through a fastener K.

The first gear shaft 311 and the second gear shaft 312 are both rotatable. The first gear portion C1 and the second gear portion C2 are engaged with each other.

The position-limiting member 310 has an accommodating groove R defined by a side close to the fixed member 301. The first gear portion C1, the second gear portion C2, the third gear portion C3, and the fourth gear portion C4 are located in the accommodating groove R, so that each gear portion is limited between the fixed member 301 and the position-limiting member 310.

The first elastic member 313 and the second elastic member 314 respectively penetrate through the first central component 304 and the second central component 305, two opposite ends of the first elastic member 313 are respectively abutted against the third torsion member 308 and the blocking member 309, and two opposite ends of the second elastic member 314 are respectively abutted against the third torsion member 308 and the blocking member 309.

Alternatively, the first elastic member 313 and the second elastic member 314 respectively penetrate through a shaft body of the first gear shaft 311 and a shaft body of the second gear shaft 312, two opposite ends of the first elastic member 313 are respectively abutted against the third torsion member 308 and the blocking member 309, and two opposite ends of the second elastic member 314 are respectively abutted against the third torsion member 308 and the blocking member 309.

In addition, the rotation mechanism 30 can further include more elastic members. These elastic members respectively penetrate through the first central component 304, the second central component 305, a shaft body of the first gear shaft 311, and a shaft body of the second gear shaft 312, and two opposite ends of these elastic members respectively abut against the third torsion member 308 and the blocking member 309.

Optionally, the first elastic member 313 includes a spring component, and the second elastic member 314 includes a spring component.

Figure 21:
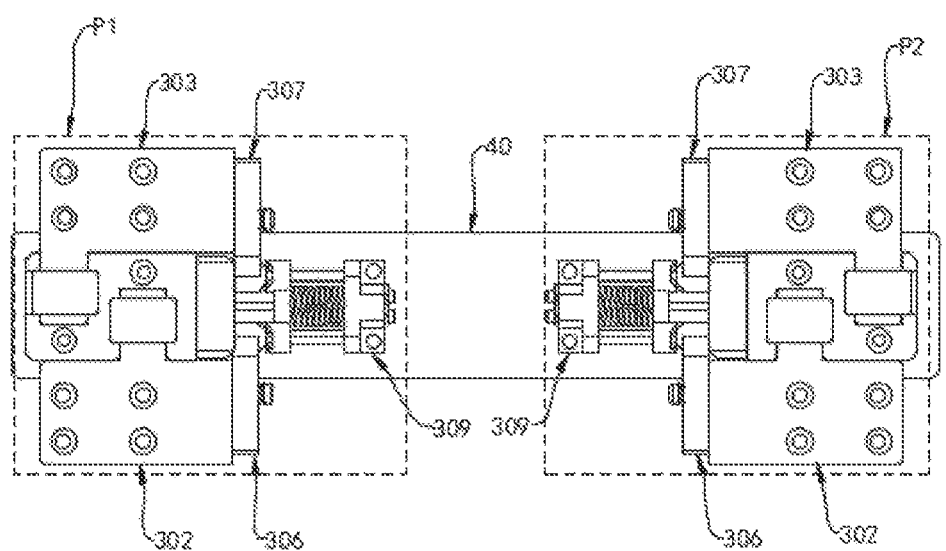
FIG. 21 is a schematic diagram of the structure of the second type of rotation mechanism provided in an embodiment of the present disclosure in a flat state.

Please refer to FIG. 2, FIG. 3, FIG. 17, and FIG. 21. FIG. 21 is a schematic diagram of the structure of the second type of rotation mechanism provided in an embodiment of the present disclosure in a flat state.

The rotation mechanism 30 includes a first part P1 and a second part P2 disposed symmetrically. The first part P1 and the second part P2 both have constituent components shown in FIG. 17.

When the rotation mechanism is in a flat state, surfaces of the first rotating member 302 and the second rotating member 303 close to a side of the display panel 20 are flushed or nearly flushed, thereby providing a flat supporting surface for the display panel 20 in an unfolded state.

Meanwhile, since the radiuses of rotations of the first rotating member 302 and the first torsion member 306 are different, the first positioning component 3021 is located at an end of the first guide rail D1 close to the first central component 304 and the second positioning component 3031 is located at an end of the second guide rail close to the second central component 305 in a flat state.

Figure 22:
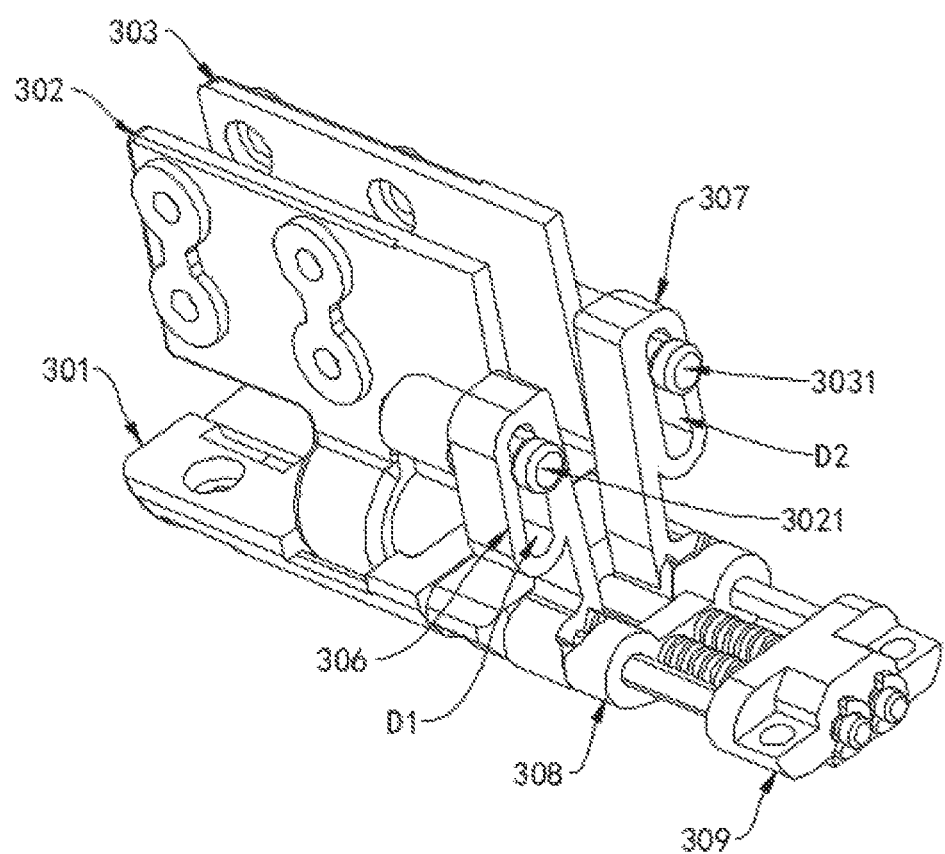
FIG. 22 is a schematic diagram of the second type of rotation mechanism provided in an embodiment of the present disclosure in a folded state.

Please refer to FIG. 2, FIG. 3, FIG. 17, and FIG. 22. FIG. 22 is a schematic diagram of the second type of rotation mechanism provided in an embodiment of the present disclosure in a folded state.

During the process of transforming from a flat state into a folded state of the rotation mechanism 30, i.e., during the folding process, the first positioning component 3021 gradually slides from an end of the first guide rail D1 close to the first central component 304 to an end away from the first central component 304, and the second positioning component 3031 gradually slides from an end of the second guide rail D2 close to the second central component 305 to an end away from the second central component 305.

During the folding process of the rotation mechanism 30, the first rotating member 302 drives the first torsion member 306 to rotate through the first positioning component 3021, the second rotating member 303 drives the second torsion member 307 to rotate through the second positioning component 3031, the force of the first positioning component 3021 on the first guide rail D1 acts on an upper end surface inside the first guide rail D1, and the force of the second positioning component 3031 on the second guide rail D2 acts on an upper end surface inside the second guide rail D2. Because the upper end surface of the first guide rail D1 is an end surface corresponding to the first torsion member 306 supporting the display panel 20, the strength of which is higher, and the deformation or breakage is not easy to be occurred, thereby enhancing the reliability of the first guide rail D1. The upper end surface of the second guide rail D2 is an end surface corresponding to the second torsion member 307 supporting the display panel 20, the strength of which is higher, and the deformation or breakage is not easy to be occurred, thereby enhancing the reliability of the second guide rail D2.

When the rotation mechanism 30 is in a folded state, the first positioning component 3021 reaches or approaches an end of the first guide rail D1 away from the first central component 304, and the second positioning component 3031 reaches or approaches an end of the second guide rail D2 away from the second central component 305.

From the above discussions, an embodiment of the present disclosure provides a foldable display device including a display panel and a rotation mechanism supporting the display panel. The rotation mechanism includes a fixed member, a first rotating member and a second rotating member connected with the fixed member, a first central component and a second central component disposed corresponding to a lateral end surface of the fixed member, and a first torsion member and a second torsion member respectively connected with the first central component and the second central component. The first rotating member is slidably connected with a first guide rail on the first torsion member through a first positioning component. The second rotating member is slidably connected with a second guide rail on the second torsion member through a second positioning component. By disposing positioning components on the rotating members and the disposing guide rails slidably connected with the positioning components on the torsion members, the force of the positioning components on the guide rails acts on the upper end surfaces of the guide rails when the rotating members drive the torsion members to rotate in the present disclosure. Since the upper end surfaces of the guide rails correspond to the end surfaces of the torsion members supporting the display panel, the strength thereof is high, so the risk of deformation or breakage of the guide rails is reduced, and the reliability of the foldable display device is increased.

It is noted that although the preferred embodiments of the present disclosure are disclosed as above, the preferred embodiments mentioned above are not intended to limit the present disclosure. Those of ordinarily skilled in the art can make various changes and modification without departing from the spirit and scope of the present disclosure. Therefore, the claimed scope of the present disclosure is based on the scope defined by the claims.

What is claimed is:

1. A foldable display device comprising a display panel and a rotation mechanism supporting the display panel, wherein the rotation mechanism comprises:
a fixed member;
a first rotating member and a second rotating member, wherein the first rotating member is rotatably connected with a side of the fixed member, the second rotating member is rotatably connected with the other side of the fixed member, the first rotating member comprises a first positioning component, and the second rotating member comprises a second positioning component;
a first central component and a second central component, wherein the first central component and the second central component are both disposed corresponding to a lateral end surface of the fixed member; and
a first torsion member and a second torsion member, wherein the first torsion member is connected with the first central component, the second torsion member is connected with the second central component, the first torsion member and the second torsion member are both rotatable with respect to the fixed member, the first torsion member comprises a first guide rail, the first positioning component is connected to the first guide rail and is slidable with respect to the first guide rail, the second torsion member comprises a second guide rail, and the second positioning component is connected to the second guide rail and is slidable with respect to the second guide rail,
wherein the first torsion member comprises a third gear portion, and the second torsion member comprises a fourth gear portion;
the foldable display device further comprises a first gear shaft and a second gear shaft disposed between the first central component and the second central component, the first gear shaft comprises a first gear portion engaged with the third gear portion, the second gear shaft comprises a second gear portion engaged with the fourth gear portion, and the first ear portion is engaged with the second gear portion.

2. The foldable display device as claimed in claim 1, wherein a thickness of at least half of an area of the first torsion member located on the first guide rail close to a side of the display panel is greater than a thickness of the first torsion member located on the first guide rail away from the side of the display panel; and
a thickness of at least half of an area of the second torsion member located on the second guide rail close to the side of the display panel is greater than a thickness of the second torsion member located on the second guide rail away from the side of the display panel.

3. The foldable display device as claimed in claim 1, wherein the first rotating member comprises a first supporting portion, the first positioning component is connected with the first supporting portion, the second rotating member comprises a second supporting portion, and the second positioning component is connected with the second supporting portion;
the first rotating member and the first torsion member are arranged along a first direction, and the second rotating member and the second torsion member are arranged along the first direction; and
the first positioning component extends the first supporting portion along the first direction and connects the first guide rail, and the second positioning component extends the second supporting portion along the first direction and connects the second guide rail.

4. The foldable display device as claimed in claim 3, wherein the first positioning component and the second positioning component comprise a positioning rod; the first guide rail and the second guide rail comprise a groove structure or a hole structure;
the first supporting portion comprises a first positioning hole, and the first positioning component penetrates through the first positioning hole; and
the second supporting portion comprises a second positioning hole, and the second positioning component penetrates through the second positioning hole.

5. The foldable display device as claimed in claim 1, wherein the first torsion member has a first torsion end disposed at an end close to the first central component, and the second torsion member has a second torsion end disposed at an end close to the second central component; and the rotation mechanism further comprises a third torsion member connected with the first central component and the second central component, and the third torsion member comprises a third torsion end matched with the first torsion end and a fourth torsion end matched with the second torsion end.

6. The foldable display device as claimed in claim 5, wherein the first torsion end comprises a first cam structure, the second torsion end comprises a second cam structure, the third torsion end comprises a third cam structure, and the fourth torsion end comprises a fourth cam structure.

7. The foldable display device as claimed in claim 5, wherein the rotation mechanism further comprises a cover fixedly connected with the fixed member, a blocking member disposed at a side of the third torsion member away from the fixed member and fixedly connected with the cover, and a position-limiting member disposed between the first torsion member and the second torsion member, and the fixed member;
   an end of the first central component is connected to the fixed member or the position-limiting member, and the other end of the first central component is connected to the blocking member; and
   an end of the second central component is connected to the fixed member or the position-limiting member, and the other end of the second central component is connected to the blocking member.

8. The foldable display device as claimed in claim 7, wherein the first torsion member is rotatably connected with the first central component, and the second torsion member is rotatably connected with the second central component.

9. The foldable display device as claimed in claim 7, wherein the first central component and the second central component are rotatable with respect to the fixed member;
   the first torsion member is connected with the first central component, and the first central component is rotated by a rotation of the first torsion member; and
   the second torsion member is connected with the second central component, and the second central component is rotated by a rotation of the second torsion member.

10. The foldable display device as claimed in claim 9, wherein a shaft body of the first central component, which is connected to the first torsion member, has a first square surface, the first torsion member comprises a first transmission hole connected with the first central component, and the first transmission hole has a first square hole matched with the first square surface; and
   a shaft body of the second central component, which is connected to the second torsion member, has a second square surface, the second torsion member comprises a second transmission hole connected with the second central component, and the second transmission hole has a second square hole matched with the second square surface.

11. The foldable display device as claimed in claim 9, wherein
   two opposite ends of a shaft body of the first gear shaft are respectively abutted against the fixed member and the blocking member, and two opposite ends of a shaft body of the second gear shaft are respectively abutted against the fixed member and the blocking member.

12. The foldable display device as claimed in claim 11, wherein the position-limiting member has an accommodating groove defined by a side close to the fixed member, the first gear portion, the second gear portion, the third gear portion, and the fourth gear portion are located in the accommodating groove.

13. The foldable display device as claimed in claim 11, wherein the rotation mechanism further comprises a first elastic member and a second elastic member;
   the first elastic member penetrates through the first central component and the second elastic member penetrates through the second central component, or, the first elastic member penetrates through the shaft body of the first gear shaft and the second elastic member penetrates through the shaft body of the second gear shaft; and
   two opposite ends of the first elastic member are respectively abutted against the third torsion member and the blocking member, and two opposite ends of the second elastic member are respectively abutted against the third torsion member and the blocking member.

14. The foldable display device as claimed in claim 1, wherein the first elastic member comprises a spring component, and the second elastic member comprises a spring component.

15. The foldable display device as claimed in claim 1, wherein the first rotating member comprises a first rotation portion, the fixed member comprises a first rotation groove slidingly matched with the first rotation portion, and the first rotation portion is connected with the first rotation groove through a first fixing pin; and
   the second rotating member comprises a second rotation portion, the fixed member comprises a second rotation groove slidingly matched with the second rotation portion, and the second rotation portion is connected with the second rotation groove through a second fixing pin.

16. A foldable display device comprising a display panel and a rotation mechanism supporting the display panel, wherein the rotation mechanism comprises:
   a fixed member;
   a first rotating member and a second rotating member, wherein the first rotating member is rotatably connected with a side of the fixed member, the second rotating member is rotatably connected with the other side of the fixed member, the first rotating member comprises a first positioning component, and the second rotating member comprises a second positioning component;
   a first central component and a second central component, wherein the first central component and the second central component are both disposed corresponding to a lateral end surface of the fixed member;
   a first torsion member and a second torsion member, wherein the first torsion member is connected with the first central component, the second torsion member is connected with the second central component, the first torsion member and the second torsion member are both rotatable with respect to the fixed member, the first torsion member comprises a first guide rail, the first positioning component is connected to the first guide rail and is slidable with respect to the first guide rail, the second torsion member comprises a second guide rail, the second positioning component is connected to the second guide rail and is slidable with respect to the second guide rail, the first torsion member has a third gear portion disposed at a side close to the first central component, and the second torsion member has a fourth gear portion disposed at a side close to the second central component; and
   a first gear shaft and a second gear shaft disposed between the first central component and the second central component, wherein the first gear shaft comprises a first gear portion, the second gear shaft comprises a second gear portion, the first gear portion and the second gear portion are engaged with each other, the third gear portion is engaged with the first gear portion, and the fourth gear portion is engaged with the second gear portion.

* * * * *